US007519639B2

(12) United States Patent
Bacon et al.

(10) Patent No.: US 7,519,639 B2
(45) Date of Patent: Apr. 14, 2009

(54) METHOD AND APPARATUS FOR DYNAMIC INCREMENTAL DEFRAGMENTATION OF MEMORY

(75) Inventors: David Francis Bacon, Sleepy Hollow, NY (US); Perry Cheng, New City, NY (US); Vadakkedathu Thomas Rajan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/751,789

(22) Filed: Jan. 5, 2004

(65) Prior Publication Data

US 2005/0149686 A1 Jul. 7, 2005

(51) Int. Cl.
*G06F 17/30* (2006.01)
*G06F 12/00* (2006.01)
(52) U.S. Cl. .................. 707/206; 711/170; 711/173
(58) Field of Classification Search ................ None
See application file for complete search history.

(56) References Cited

U.S. PATENT DOCUMENTS

| 5,604,902 | A | * | 2/1997 | Burkes et al. | 707/206 |
|---|---|---|---|---|---|
| 5,680,582 | A | * | 10/1997 | Slayden | 711/171 |
| 5,687,368 | A | * | 11/1997 | Nilsen | 707/103 R |
| 5,761,536 | A | * | 6/1998 | Franaszek | 710/68 |
| 5,857,210 | A | * | 1/1999 | Tremblay et al. | 707/206 |
| 6,131,150 | A | * | 10/2000 | DeTreville | 711/173 |
| 6,421,689 | B1 | * | 7/2002 | Benson et al. | 707/206 |
| 6,480,862 | B1 | * | 11/2002 | Gall | 707/3 |
| 6,542,978 | B2 | * | 4/2003 | Goldstein et al. | 711/170 |
| 6,826,583 | B1 | * | 11/2004 | Flood et al. | 707/206 |
| 6,874,074 | B1 | * | 3/2005 | Burton et al. | 711/170 |
| 6,938,245 | B1 | * | 8/2005 | Spertus et al. | 717/127 |
| 6,978,448 | B1 | * | 12/2005 | Plummer et al. | 717/140 |
| 2004/0073764 | A1 | * | 4/2004 | Andreasson | 711/170 |
| 2004/0078381 | A1 | * | 4/2004 | Blandy et al. | 707/101 |
| 2005/0114413 | A1 | * | 5/2005 | Subramoney et al. | 707/206 |
| 2005/0268049 | A1 | * | 12/2005 | De Lange | 711/149 |

OTHER PUBLICATIONS

A Real-time Garbage Collector with Low Overhead and Consistent Utilization, Bacon et al. Published: POPL'03, Jan. 15-17, 2003, ACM 1-58113-628-5/03/0001, pp. 285-298.*

(Continued)

*Primary Examiner*—Hyung S Sough
*Assistant Examiner*—Kaushikkumar Patel
(74) *Attorney, Agent, or Firm*—Michael J. Buchenhorner; Vazken Alexanian

(57) ABSTRACT

A garbage collection process for managing a memory includes a defragmentation cycle. The garbage collection process is interleaved with a running application on a time-based or work-based schedule. The memory is divided into pages which are further divided into blocks falling into one of a number of block size classes. Objects that were not used by applications during the last garbage collection phase are marked. Objects that were used are moved from pages containing the least live objects to pages containing the most live objects. Objects of the largest block size classes are moved first and objects of the smallest block size class are moved last. The garbage collection interval can be selected to satisfy desired CPU utilization or memory overhead requirements.

4 Claims, 5 Drawing Sheets

OTHER PUBLICATIONS

Controlling Fragmentation and Space Consumption in the Metronome, a Real-time Garbage Collector for Java, by Bacon et al. Published, LCTES'03 Jun. 11-13, 2003, ACM 1-58113-647-1/03/0006, pp. 1-12.*

Maintaining Windows 2002 Peak Performance Through Defragmentation, Microsoft TechNet, pp. 1-7.*

Memory fragmentation in buddy methods for dynamic storage allocation. Allan G. Bromley (Acta Informatica, ISSN: 0001-5903/80/0014/0107, pp. 107-117, 1980).*

"Trading Data Space for Reduced Time and Code Space in Real-Time Garbage Collection on Stock Hardware", by Rodney Brooks, pp. 256-262.*

* cited by examiner

METHOD AND APPARATUS FOR DYNAMIC INCREMENTAL DEFRAGMENTATION OF MEMORY

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of computer memory management. More particularly, the present invention relates to a method and apparatus for defragmenting a memory without stopping the running of an ongoing application.

BACKGROUND OF THE INVENTION

With regard to computers, garbage collection refers to a process of identifying unused areas of main memory storage. In object-oriented computing languages, the computer executing the program allocates memory for each of the objects. A Java Virtual Machine (JVM) using the object oriented programming language Java allocates memory for the instantiation of the objects from a free memory area called a heap. Memory is allocated to, and freed from, the heap in blocks of one of a number of predetermined sizes. Eventually, when the objects are no longer being referenced by the program, the memory allocated for the created objects is reclaimed through a process called garbage collection. The garbage collection process clears the objects from memory such that the once allocated memory is again available for use. More particularly, a garbage collection process involves automatically determining which blocks of memory can be freed, marking unused blocks as no longer needed by an application, collecting all of the unused blocks of memory at periodic intervals, returning the unused blocks to the heap, and marking the blocks as free for use. Such a garbage collection process is often referred to as a mark-and-sweep since unused portions of memory are marked as garbage during a mark phase and then removed from allocated memory in a sweep phase. Although the process of garbage collection frees memory it may be problematic in applications where its unpredictable consumption of processor time affects the running of the application. In addition, the constant allocating and freeing of blocks of memory tends to fragment the memory over time.

The exact garbage collection strategy used by an object oriented program will often vary depending on the type of system in which the program is executing. For example, in some JVM implementations, the garbage collector is a built-in component. In other applications, different garbage collectors may be plugged in for different circumstances. Many different algorithms have been employed in these different garbage collector implementations. For example, server applications in a multi-user multiprocessor environment tend to have a memory-use profile that differs from a desktop computer environment. Furthermore, embedded-Java devices such as cell phones and handheld devices have different memory-use profiles. A single garbage collector is typically designed to implement one particular strategy and cannot be modified "on-the-fly" to change its strategy. Therefore, a customized garbage collector must typically be built into each programming instance depending upon the computer platform and operating environment in which the program is executing. On any given day, a particular set of garbage collection characteristics or garbage collection algorithm metrics will be better for one device but not for another device. For example, a device with a small amount of memory may require a very aggressive garbage collection routine whereas as a large server with lots of memory may permit a more relaxed approach. In each case, a different type of garbage collection algorithm is needed in order to adapt the performance of the garbage collector to the performance characteristics of the hardware platform. Therefore, what is needed is a garbage collection process that can be easily be tuned for a variety of particular applications.

There are several common techniques for garbage collection. One technique is referred to as "copying" and relates to logically dividing the memory in half and using only one half of the memory at a time. During garbage collection, the collection routine copies all live objects to the other half of the memory. Following the copying of all the live objects, the memory manager adds the entire first half of memory to the free list. Consequently, the previously used memory which contained both the live objects and the garbage objects becomes free memory. In other words, the garbage filled memory has been reclaimed for later use. Another garbage collection technique is the mark-and-sweep method. The mark-and-sweep technique marks all live objects of memory. Each memory object usable by a program application is marked as used by the garbage collector. The garbage collector then sweeps the entire heap to reclaim all unmarked objects of memory by adding the unmarked objects to the free list. When the sweep phase is complete, all garbage objects are now on the free list and available to be reallocated to a computer program.

In some instances, the mark-and-sweep technique might be preferred over the copying technique because it is faster than copying, since the copying of objects and updating the references takes more time than adding a garbage block to a free list. Moreover, the mark-and-sweep technique is often more space efficient since it uses the whole memory, as opposed to only half, as used in the copying technique. However, in other situations, the copying technique may be preferred due to the lack of fragmentation and in instances having a relatively small number of live memory blocks.

Unfortunately, the mark-and-sweep technique has disadvantages. One such disadvantage is that the sweep function of the mark-and-sweep technique examines every single memory block. This is time consuming if the number of live objects is low relative to the number of objects allocated. In particular, some applications such as anti-lock brake management system are real time applications in that they require that a primary application never stop running. In such an application, it is important that the amount of processor time and memory devoted to garbage collection not interrupt the running of the application or mutator. In addition, it is important that the memory not be fragmented to the point that a certain level of memory is not available for the primary application. Unfortunately, prior art garbage collection routines cannot guarantee a given level of performance. Therefore, what is needed is a real time garbage collection algorithm with guaranteed performance that allows for managed defragmentation of the memory.

SUMMARY OF THE INVENTION

An application of the present invention is directed toward a method of defragmenting a memory heap arranged into a series of pages further divided into blocks of one of a number of different block size classes. In accordance with the method, objects are marked in the memory that were not used during a previous cycle as dead objects. Objects that were used during the previous cycle are marked as live objects. Pages of memory containing the dead objects are defragmented such that there is at most one page having both used and dead objects by moving live objects from pages having a least number of live objects to pages having a greatest number of live objects. The defragmenting is performed for objects in each of the different size classes of blocks progressing from a largest block size to a smallest block size. The sizes of the classes of block sizes are selected such that adjacent classes $c_i$ and $c_{(i-1)}$ satisfy the formula $c_i = c_{(i-1)}(1+\rho)$ where $\rho$ is a desired bound ratio for the internal defragmentation. The pages are sorted to form a list of the pages such that a first page in the list has a lowest number of dead objects and a last page in the list has a highest number of dead objects. The used objects are then moved from the last page in the list to the first page in the list and the pages are progressed through as the pages are respectively filled and evacuated until all of the used objects have been moved. The objects are moved to blocks of memory that are of a smallest size class that will contain the object being moved. A read barrier with a forwarding pointer is used to assist in moving the objects. The defragmentation process is preferably performed as part of a garbage collection process and is only performed when a number of empty pages of memory drops below a threshold level.

Yet another application of the present invention is directed toward a method of defragmenting a memory divided into a series of pages without affecting a running application. The pages of memory are divided into a series of blocks of different size classes. The size of the block size classes is selected to limit an amount of internal fragmentation. In accordance with the method, the memory is arranged into a number of pages. A number of dead objects on each of the pages of the memory is determined. The pages are then sorted by the number of dead objects on each of the pages to create a list of pages proceeding from a page having a lowest number of dead objects and to a page having a highest number of dead objects. A read barrier is used to move used objects saved in the memory from the page having the highest number of dead objects to the page having the lowest number of dead objects. An allocation pointer is set to the page having the lowest number of dead objects and an evacuation pointer is set to the page having the highest number of dead objects. The allocation pointer is then progressed to a subsequent page when all blocks of memory on a previous page have been allocated and the evacuation pointer is progressed to a subsequent page when all of the live objects have been evacuated from a previous page. The allocation pointer and the evacuation pointer are progressed until the pointers point to the same page. When the defragmentation is performed as part of a garbage collection process, the pointers in the read barrier are preferably altered to reflect new locations of the objects during a mark phase of a mark and sweep garbage collection process. A frequency at which garbage collection is scheduled is also preferably selected to limit a processor's utilization or a required memory size.

Yet another application of the present invention is directed toward a software program for managing a memory heap for a processor running a time sensitive application. The software program includes a garbage collection routine. The garbage collection routine includes a defragmentation routine wherein used objects are moved from pages of memory containing a lowest amount of used objects to pages of memory containing a highest amount of used objects. The software sorts the pages of memory based on a number of dead objects on the pages. The garbage collection routine and the application are interleaved on a time-based or work-based schedule. The software divides the pages of memory into blocks of different size classes. Objects of larger block size classes are moved before blocks of the lower block size classes. A read barrier having a to-space invariant is included. A forwarding pointer is located in a header of each object. Optimizing software optimizes the read barrier to reduce its software overhead.

DETAILED DESCRIPTION

A collector constructed in accordance with a preferred embodiment of the present will provide guaranteed performance provided the application is correctly characterized by the user. In particular, the user must be able to specify the maximum amount of simultaneous live data, m, as well as the peak allocation rate over the time interval of a garbage collection $a^*(\Delta GC)$. The collector is parameterized by its tracing rate R. Given these characteristics of the mutator and the collector, the user then has the ability to tune the performance of the system using three interrelated parameters: total memory consumption, minimum guaranteed CPU utilization and the resolution at which the utilization is calculated.

Figure 1:
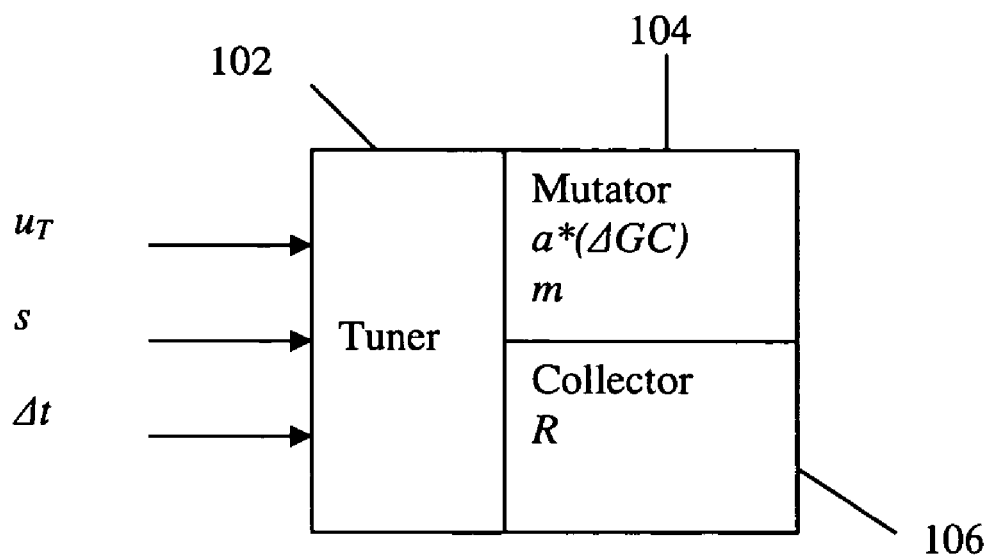
FIG. 1 is a diagram of the system parameters that can be used to tune the performance of an object oriented application in accordance with an embodiment of the present invention.

The relationship between these parameters is shown graphically in FIG. 1. The mutator 104 is characterized by its allocation rate over a garbage collection interval $a^*(\Delta GC)$ and by its maximum memory requirement m. The collector 106 is characterized by its collection rate R. The tunable parameters 102 are $\Delta t$, the frequency at which the collector is scheduled, and either the CPU utilization level of the application $u_T$ (in which case a memory size s is determined) or a memory size s which determines the utilization level $u_T$. By setting these parameters to limit CPU utilization and memory size, and using the defragmentation techniques set forth in more detail below, a garbage collection routine can be implemented in a real time application such as an automotive control system that has strict availability requirements.

Figure 2:
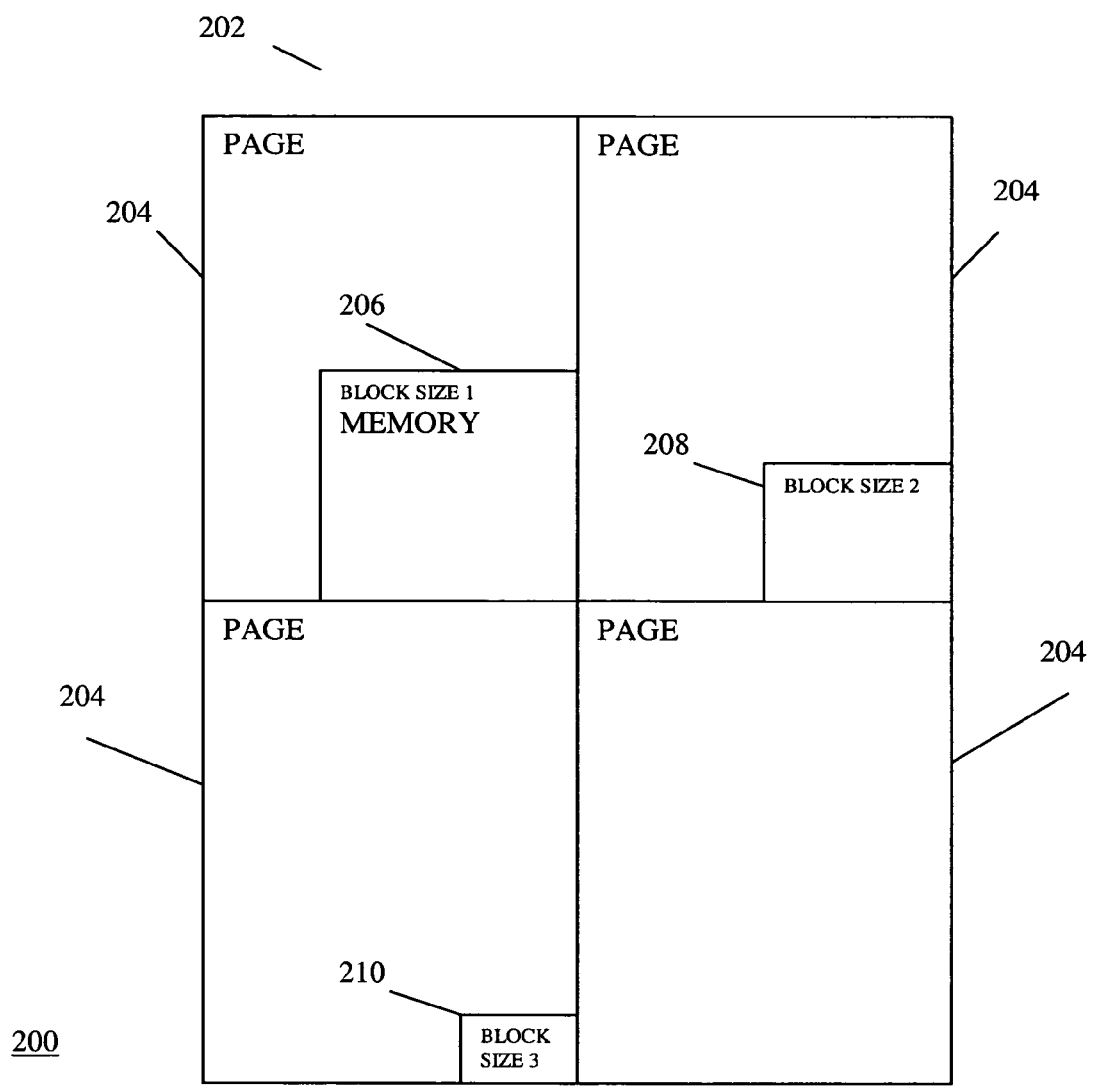
FIG. 2 is a diagram of a method of dividing a memory into pages and block class sizes in accordance with an embodiment of the present invention.

Referring now to FIG. 2, a diagram 200 of a system 200 of dividing a memory 202 in accordance with a preferred embodiment of the present invention is shown. The memory 202 is divided into a series of pages 204 each of a size Π. Each page 204 is divided into a number of fixed size blocks 206, 208 and 210 with a maximum block size 206 of Σ. In a preferred embodiment, the page size, Π, and the maximum block size, Σ, are both powers of two. While the maximum block size is Σ, a number, n, of smaller classes of block sizes are also created. Memory is allocated for objects from blocks of the smallest size class that will accommodate the object. Using a large number of block size classes with a relatively low ratio of adjacent class sizes reduces the amount of fragmentation as discussed in more detail below.

The total fragmentation of a system such as that shown in FIG. 2 can be categorized as one of three types. First, there is unused space at the end of each block which is referred to as internal fragmentation. Internal fragmentation is fundamentally expressed as a ratio between the inherent space required by live objects and the actual amount of space they consume. A ratio ρ between the adjacent block sizes shown in FIG. 2 can be used to bound the amount of internal fragmentation. In particular, a preferred embodiment of the present invention uses a small ratio between adjacent block size classes because, even if fragmentation occurs, the blocks will be compacted and contents of unused pages can be redistributed to other sizes. Thus, the internal fragmentation is limited to ρ by selecting the block size classes such that adjacent size classes $c_i$ and $c_{(i-1)}$ satisfy the formula $c_i = c_{(i-1)}(1+\rho)$. The collector is, thus, adaptive in that it responds to the changing object size needs of an application. However, it will be appreciated that when the system is operating in the steady state, the distribution of object sizes is relatively constant and little defragmentation may actually be required.

Secondly, there is unused space at the end of a page which is referred to as page-internal fragmentation. The ratio of the page size to the largest block class size primarily determines the amount of page-internal fragmentation. More particularly, the amount of internal fragmentation is generally bound by the largest block size divided by the page size. Thus, the selection of the page size and the largest block size class may be used to bound the page-internal fragmentation for time or memory sensitive applications.

Finally, there are unused blocks that could satisfy a request for a different size object. This type of fragmentation is referred to as external fragmentation. External fragmentation only occurs on pages that have both live and dead objects. External fragmentation is often determined by the size of the objects being allocated by the application. Applications typically exhibit locality in that the number of objects of a particular size class that were allocated during a previous cycle is often a good predictor of the number of objects in the size class that will be allocated during the next cycle. External fragmentation is practically eliminated in accordance with an embodiment of the present invention by using arraylets or blocks whereby large arrays are broken into fixed-sized pieces. An arraylet is a block of maximum class size. This bounds the potential external fragmentation caused by large objects. In addition, explicit defragmentation may be performed on pages containing dead objects as discussed in more detail herein.

A read barrier is preferably used to address the pages and blocks of the memory. A most preferred embodiment of the present invention uses a Brooks-style read barrier wherein each object contains a forwarding pointer that normally points to itself. However, when the object has been moved, the pointer points to the moved object. Because the preferred embodiment uses a forwarding pointer, the collector maintains a to-space invariant. Thus, the mutator or application always sees the new version of an object. However, the sets comprising the from-space and to-space have a large intersection, rather than being completely disjoint as in a pure copying collector. While the preferred embodiment uses a read barrier and a to-space invariant, the collector does not suffer from variations in mutator utilization because all of the work of finding and moving objects is performed by the collector during the collection phase.

Figure 3:
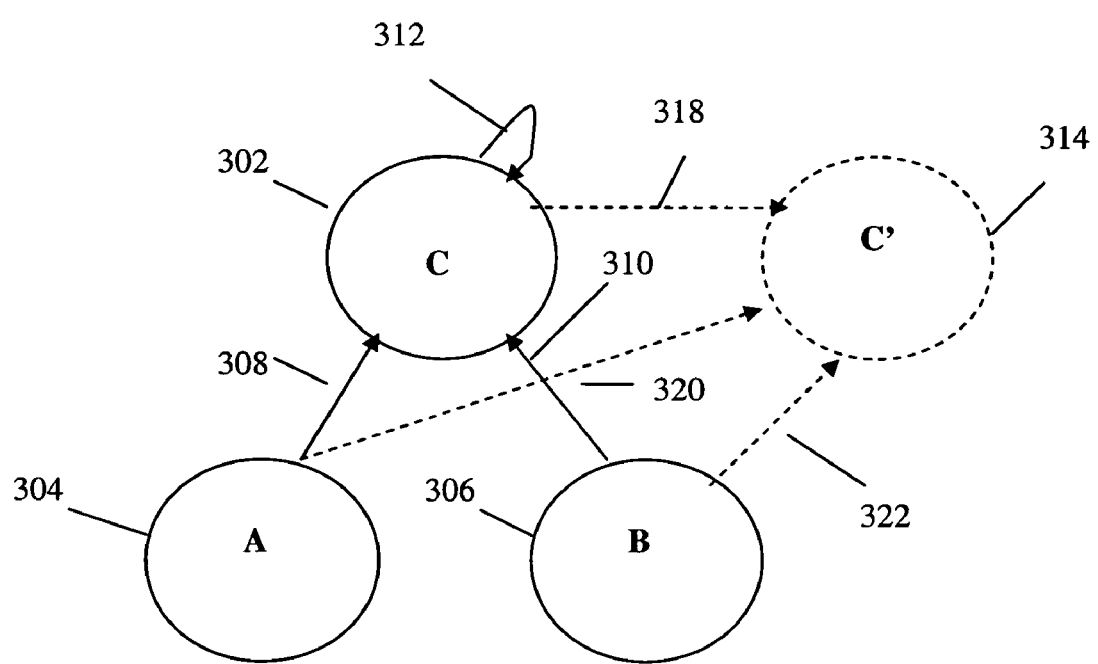
FIG. 3, is an illustration of a method of moving objects using a read barrier with a forwarding pointer in accordance with an embodiment of the present invention.

A preferred method 300 of moving of an object using a read barrier with a forwarding pointer in accordance with an embodiment of the present invention is described with respect to FIG. 3. The object to be moved C 302 is referenced by two applications A 304 and B 306 which have their respective pointers 308 and 310 pointing toward C 302. The forwarding pointer 312 in C 302 originally points to C 302 itself. To move the object C 302, a new block of memory C' 314 is first allocated for the object C 302. Once a new block of memory has been allocated, the content of C 302 is then moved into C' 314. The forwarding pointer 312 of object C 302 is then pointed 318 toward C' 314. Thus, if an application calls on object C 302, the forwarding pointer 318 redirects the application to C' 314. Finally, the pointers 308 and 310 from applications A 304 and B 306 are redirected, as shown by arrows 320 and 322 respectively, toward the new memory location for the object C' 314. Thus, the collector maintains a to-space invariant such that the mutator or application always sees the new version C' of the object C. Once the pointers 308 and 310 have been updated to pointers 320 and 322 to point to C' 314, the object C 302 is no longer referenced by an application. Thus, the object C 302 will be marked as unused or dead during the mark phase such that the memory blocks will be freed for future use as discussed in more detail below.

The preferred embodiment overcomes the high software costs typically associated with read barriers by using an optimizing compiler wherein the compiler is able to optimize the barriers. A number of optimizations can be used to reduce the costs of the read barriers. Common sub-expression elimination, as well as other special purpose optimizations like barrier-sinking in which the barrier is sunk down to its point of use to thereby allow the null-check required by the Java object dereference to be folded into the null-check required by the barrier, can be used. Since the pointer can be null, the barrier cannot perform forwarding unconditionally. Optimization works with whatever null-checking approach is used by the run time system whether it is accomplished via explicit comparisons or implicit traps on null dereferences. The point is to usually avoid introducing explicit checks for null and the preferred embodiment guarantees that any exception due to a null pointer occurs at the same place as it would have in the original program.

Figure 4:
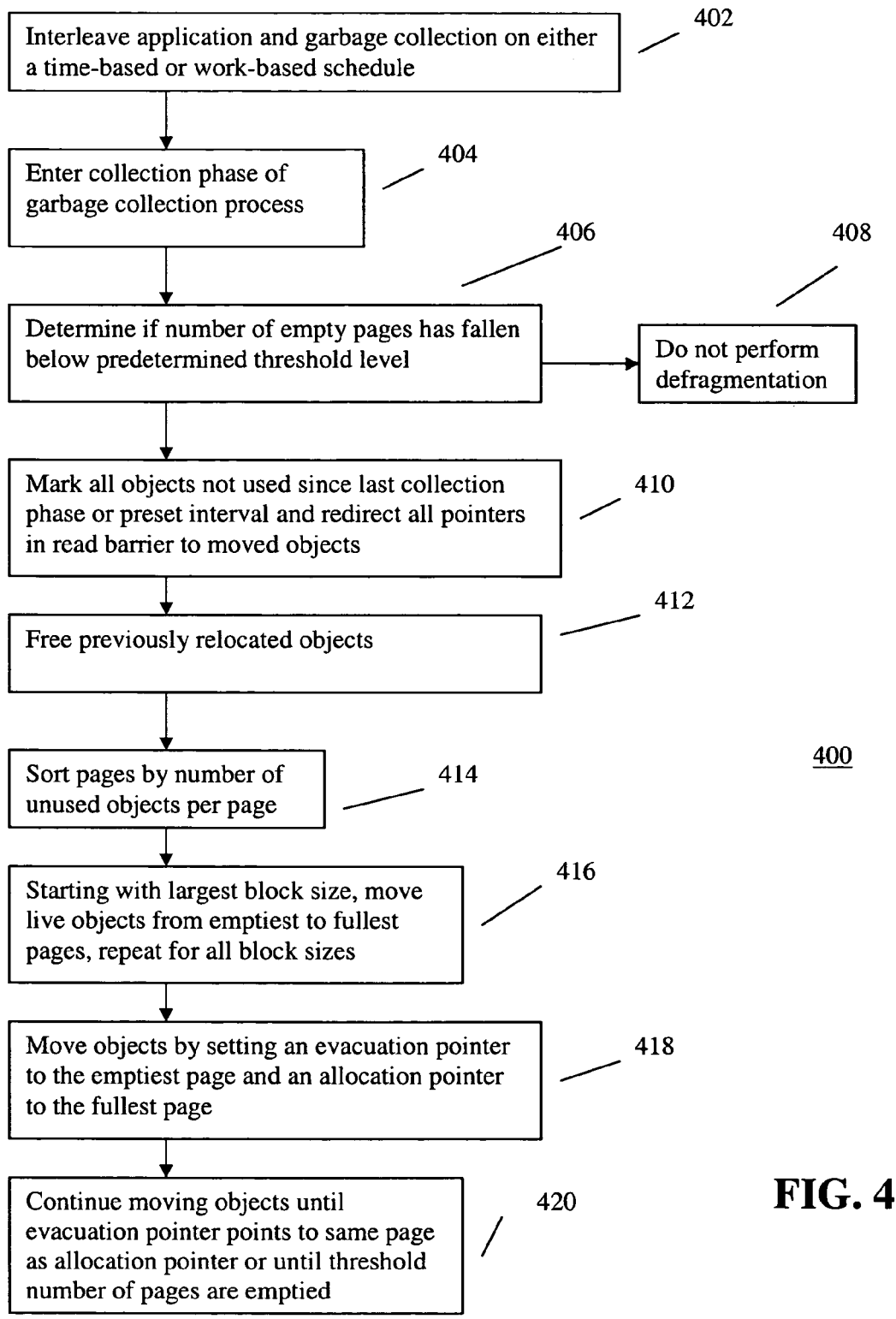
FIG. 4 is a flow chart for implementing a defragmentation process during a garage collection phase in accordance with an embodiment of the present invention.

Referring now to FIG. 4 a preferred method 400 for accomplishing defragmentation during the collection phase of a garbage collection process is shown. In step 402, the application and garbage collection are interleaved on either a time-based or work-based schedule. Work-based algorithms may achieve short individual pause times but are typically unable to achieve consistent utilization. A work-based algorithm does a little garbage collection each time the mutator allocates memory. By keeping this interruption short, the work of collection is spread evenly throughout the application. Unfortunately, programs are not uniform in their allocation behavior over short time scales, rather they are bursty. As a result, work-based strategies suffer from very poor mutator utilization during such bursts of allocation. Time-based scheduling interleaves the collector and the mutator on a fixed schedule. These systems are quite stable and only require a small number of coarse parameters that describe the application's memory characteristics to function within well controlled space bounds.

Defragmentation occurs during the garbage collection phase as set forth in step 404. First, it is determined whether or not the number of empty pages of memory has fallen below a threshold number of empty pages of memory as shown in step 406. If the threshold has not been breached, the proceeds to step 408 wherein no defragmentation occurs during the present garbage collection phase. The threshold number of pages is selected such that there is always enough memory to run the primary real time application. If the threshold has been breached, the method proceeds to step 410 wherein all objects that have not be used since the last collection cycle are marked as dead objects. During the mark phase of the garbage collection process, the memory blocks for all of the objects that have been previously relocated during a previous collection process as described with respect to FIG. 2 are freed or released for future use as shown in step 412.

Once the objects have been marked as used or unused, the pages of memory are sorted according to the number of dead objects per page as shown in step 414. In one embodiment, the first entry in the list contains the page with the least number of dead objects and the last entry contains the page with the greatest number of dead objects. In step 416, starting with the largest block size, live objects are moved from the pages having the most dead objects to pages having the least dead objects. After the largest block class sized objects have been moved, the process is repeated for each lower block size. The later smaller classes of blocks are used to fill in the holes left by the allocation of the larger earlier blocks. Thus, proceeding in this manner reduces the internal fragmentation of the heap. The objects are preferably moved by setting an evacuation pointer to the emptiest page and an allocation pointer to the fullest page in step 418. The process continues in step 420 until the evacuation pointer and the allocation pointer point to the same page or, alternatively, until the threshold number of pages has been emptied. The process then waits until the threshold is again violated at which time the garbage collection cycle begins again.

Figure 5:
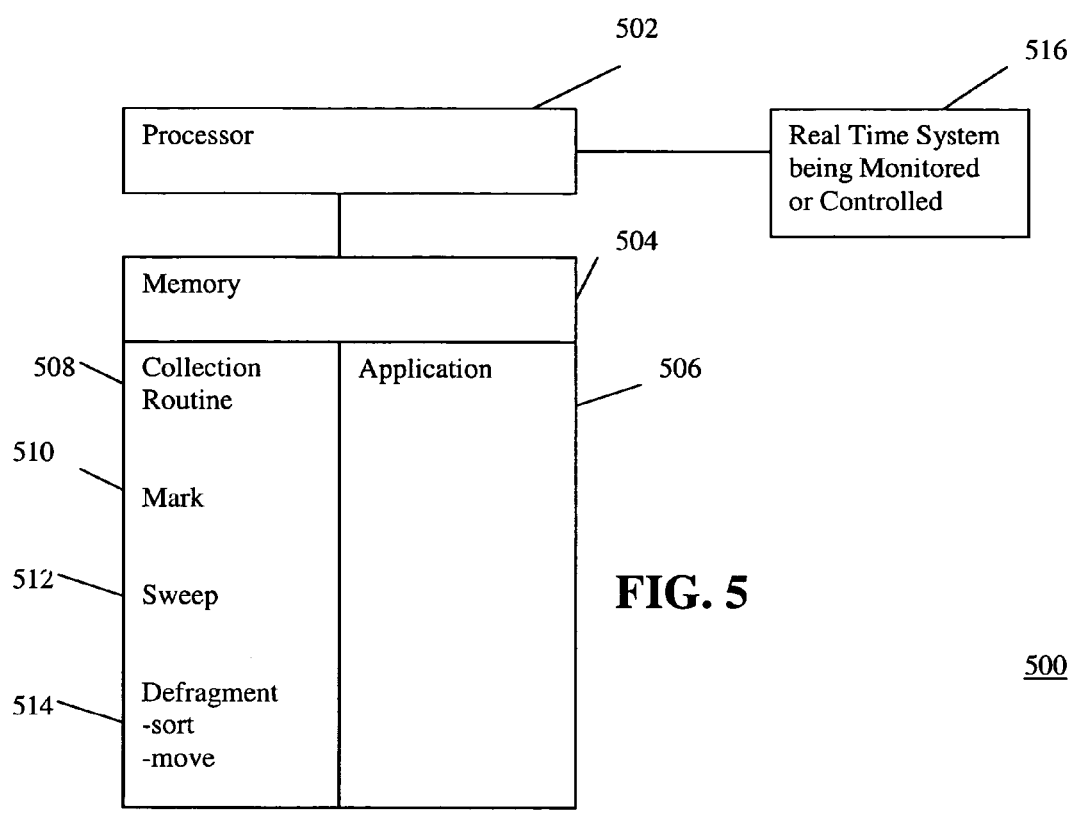
FIG. 5 is a diagram of an implementation of an embodiment of the present invention.

Referring to FIG. 5, a preferred embodiment 500 of the present invention can be implemented in software in a memory 504 that runs on a processor 502. The memory contains programming for an application 506 and a garbage collection process 508. A defragmentation routine 514 is inserted into a mark 510 and sweep 512 garbage collection routine 508 that functions as described in more detail above. The processor 502 interleaves the application 506 with the garbage collection process 508 having the mark 510, sweep 512 and defragmentation 514 routines. The garbage collection process 508 is bounded with respect to the time for collection and the overhead memory space required as described herein. Thus, the invention may be used to insure that an adequate amount of processor 502 capacity and memory is available to properly run the real time system 516 being controlled or monitored by the processor 502 and application software 506.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

What is claimed is:

1. A method of defragmenting a memory heap arranged into a series of pages, the method comprising:
    dividing the pages of the memory heap into a series of blocks of different size classes;
    selecting a size of the blocks to limit an amount of internal fragmentation;
    determining that a number of empty pages of memory has fallen below a threshold number of empty pages of memory;
    marking objects in the memory heap that were not used during a previous garbage collection cycle as dead objects;
    marking objects in the memory heap that were used during the previous garbage collection cycle as live objects;
    sorting pages of the memory heap according to a number of dead objects per page, from a fullest page to an emptiest page; wherein the emptiest page is the page with a highest number of dead objects; and the fullest page is the page with a least number of dead objects;
    setting an evacuation pointer to the emptiest page;
    setting an allocation pointer to the fullest page;
    starting with a largest block size, defragmenting pages of the memory heap containing the dead objects by iteratively moving the live objects from the emptiest pages to the fullest pages and evacuating the dead objects evacuating the dead objects when the emptiest pages become filled with only the dead objects; wherein the defragmenting is performed without stopping execution of an application calling the live and dead objects;
    wherein moving the live objects comprises:
        using a read barrier with a forwarding pointer that originally points to the object itself;
        allocating a new block of memory in a page for a copy of the object; and
        once the new block is allocated, redirecting the forwarding pointer so that it points to the new block;
    progressing the allocation pointer to a subsequent page when all blocks on a previous page have been allocated;
    progressing the evacuation pointer to a previous page when all the live objects have been moved from a current page;
    after the largest block size objects have been moved, repeating the sorting, setting, defragmenting, and progressing steps for each lower block size until the allocation and evacuation pointers point to the same page, such that there is at most one page having both live and dead objects.

2. The method of claim 1 comprising performing the defragmentation process as part of a mark and sweep garbage collection process.

3. The method of claim 1 further comprising moving each live object to a smallest block that can contain the live object.

4. The method of claim 1 wherein sizes of the classes of block sizes are selected such that adjacent classes $c_i$ and $c_{(i-1)}$ satisfy the formula $c_i = c_{(i-1)}(1+\rho)$ where $\rho$ is a desired bound ratio for internal defragmentation.

* * * * *